(12) United States Patent
Lindberg et al.

(10) Patent No.: US 6,442,160 B1
(45) Date of Patent: Aug. 27, 2002

(54) GENERAL SWITCH AND A SWITCHING METHOD

(75) Inventors: Mikael Lindberg, Täby; Ulf Hansson, Huddinge, both of (SE)

(73) Assignee: Telefonaktiebolaget LM Ericsson, Stockholm (SE)

(*) Notice: Subject to any disclaimer, the term of this patent is extended or adjusted under 35 U.S.C. 154(b) by 0 days.

(21) Appl. No.: 09/141,179

(22) Filed: Aug. 27, 1998

(30) Foreign Application Priority Data

Aug. 28, 1997 (SE) .............................................. 9703105
Nov. 21, 1997 (SE) .............................................. 9704278

(51) Int. Cl.$^7$ ............................................... H04L 12/50
(52) U.S. Cl. ...................................... 370/369; 370/373
(58) Field of Search .................................. 370/391, 468, 370/377, 379, 369, 373

(56) References Cited

U.S. PATENT DOCUMENTS

| | | | |
|---|---|---|---|
| 4,718,058 A | 1/1988 | van Vugt | 370/358 |
| 5,351,236 A | * 9/1994 | Pawelski | 370/58.1 |
| 5,453,985 A | 9/1995 | Ghisler | 370/358 |
| 5,640,391 A | 6/1997 | Nitta et al. | 370/341 |
| 5,784,369 A | * 7/1998 | Romiti et al. | 370/358 |

FOREIGN PATENT DOCUMENTS

| | | |
|---|---|---|
| EP | 0 483 516 | 5/1992 |
| EP | 0 769 887 | 4/1997 |
| GB | 2 299 241 | 9/1996 |
| WO | 97/27720 | 7/1997 |

* cited by examiner

*Primary Examiner*—Melvin Marcelo
*Assistant Examiner*—Ron Abelson
(74) *Attorney, Agent, or Firm*—Burns, Doane, Swecker & Mathis, L.L.P.

(57) ABSTRACT

In a general switch, a word oriented switch and a bit oriented switch are connected such that a common input signal included data appearing in time slots is provided to both switches. The general switch further includes a device for establishing, for each one of a number of outgoing time slots, at least one of a first connection path through the word oriented switch and a second connection through the bit oriented switch, and a device for selecting, for each outgoing time slot, data from an established one of the connection path. For each outgoing time slot, only one of the connection paths is established and the selecting device selects data from the established connection path.

18 Claims, 10 Drawing Sheets

GENERAL SWITCH AND A SWITCHING METHOD

This application claims priority under 35 U.S.C. §§ 119 and/or 365 to application Nos. 9703105-8 and 9704278-2 filed in Sweden on Aug. 28 and Nov. 21, 1997, respectively, the entire content of which is hereby incorporated by reference.

TECHNICAL FIELD

The present invention generally relates to a general switch and a switching method, and more particularly to a general switch which includes a word oriented switch and a bit oriented switch.

BACKGROUND OF THE INVENTION

Public transmission networks for telecommunications generally operate at a bit transfer rate of 64 kbit/s, transmitting digital signals on transmission links that are adapted for this bit rate. The signal data normally appear in time slots, and in conventional networks, each time slot is reserved for a specific channel.

Figure 1:
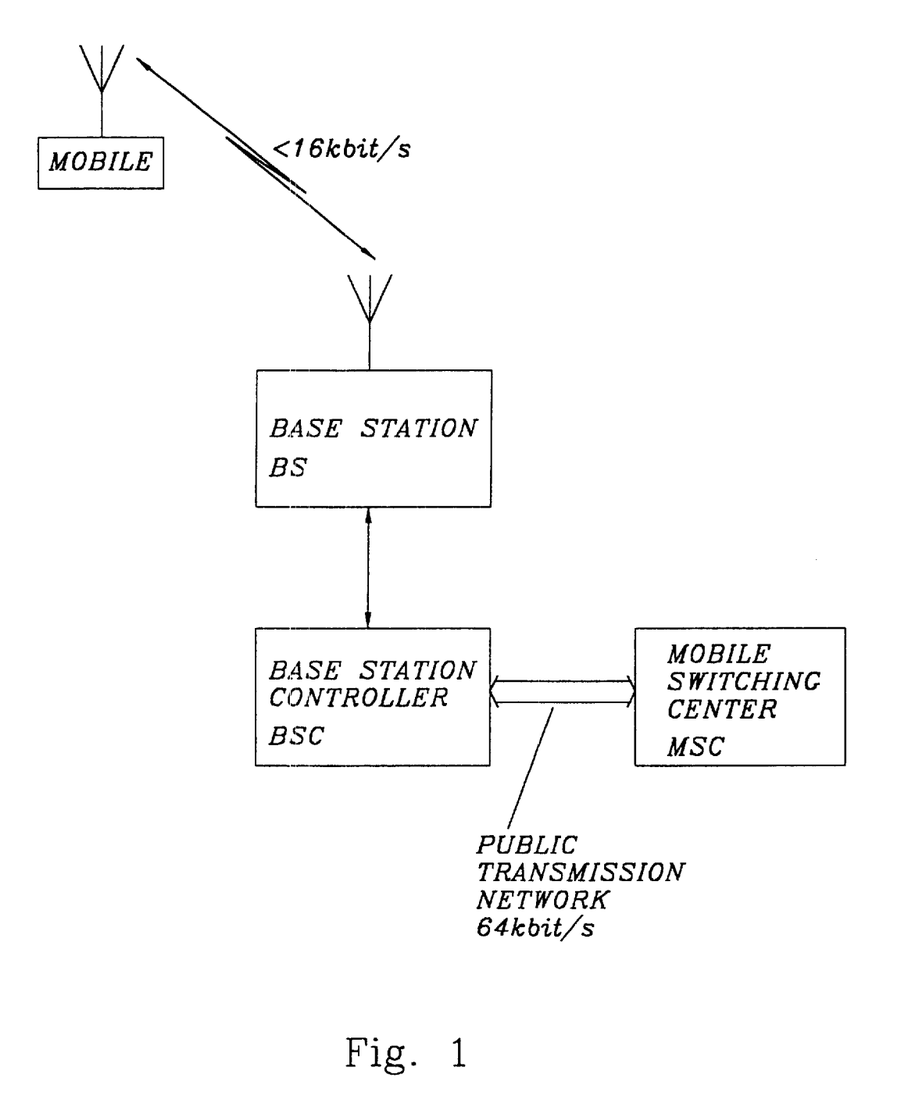
FIG. 1 is a schematic diagram of a mobile unit in communication with a base station controller which is connected to a mobile switching center over the public transmission network.

However, many of the operator exchangers connected to the public transmission network only require bit transfer rates that are much lower than 64 kbit/s. Examples of such lower bit transfer rates, so called subrates, are 8 or 16 kbit/s. Referring to FIG. 1, in digital mobile telephony for example, speech information is normally coded by a speech coder in such a way that a lower bit transfer rate over the radio link between the mobile unit MOBILE and the base station BS is obtained. In the GSM system, for instance, traffic between a mobile unit MOBILE and a base station BS is generally transmitted at a relatively low bit transfer rate, normally less than 16 kbit/s (GSM fullrate 13.0 kbit/s, GSM halfrate 5.6 kbit/s). In general, several base stations BS are connected to a base station controller BSC which handles the traffic between the base stations BS and the corresponding mobile units MOBILE. The traffic between the base station controllers BSC and mobile switching centers MSC often utilizes the normal public transmission network which operates at the higher bit transfer rate of 64 kbit/s. If the base station controllers BSC would switch GSM traffic of a bit rate less than 16 kbit/s directly onto a 64 kbit/s transmission network, a lot of bandwidth capacity would be wasted. Each channel would then occupy only one fourth or one eight of the bit positions of its reserved time slot. However, by circuit switching this traffic on bit level instead of word level, it is possible to fully utilize the bandwidth capacity offered by the normal public transmission network by packing several subrate channels into a new and fully packed time slot that is subsequently sent over the public transmission network.

Figure 2:
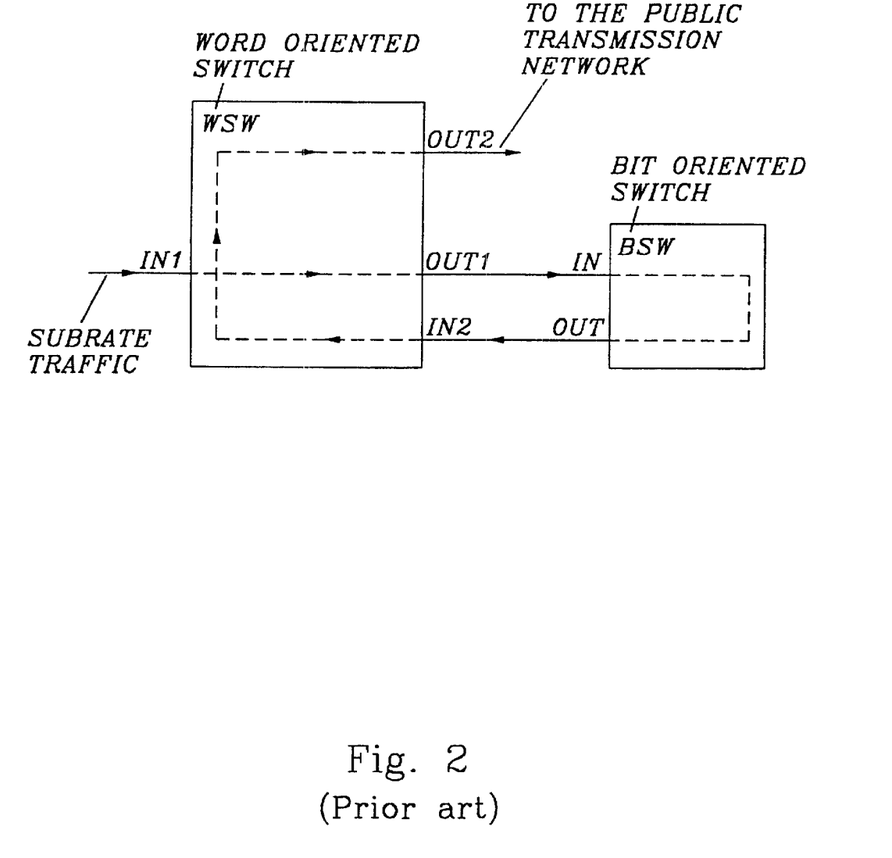
FIG. 2 is a schematic diagram of a word oriented switch connected to a bit oriented switch according to the prior art.

According to the prior art, bit level circuit switching is normally provided by connecting an external bit oriented switch, also referred to as a subrate switch, in series with the ordinary word oriented switch with a connection from the bit oriented switch back to the word oriented switch. FIG. 2 is a schematic diagram illustrating such a prior art arrangement of a word oriented switch WSW and a bit oriented switch BSW. The word oriented switch WSW and the bit oriented switch BSW have input terminals for receiving data and output terminals for outputting data. The word oriented switch WSW is characterized in that only entire words can be processed.

Now, assume that the word oriented switch WSW receives subrate traffic at a first input terminal IN1. The subrate traffic appears in time slots, in which only a portion of the bit positions is occupied. The subrate traffic is switched through the word oriented switch WSW on word level, and outputted at a first output terminal OUT1. The first output terminal OUT1 of the word oriented switch WSW is connected to an input terminal IN of the bit oriented switch BSW. In the bit oriented switch BSW bit level switching is performed to form new words in which a number of subrate traffic channels are packed. The normal procedure is to form words that are fully packed. These new words are outputted from the bit oriented switch BSW at an output terminal OUT. The output terminal OUT of the bit oriented switch BSW is connected to a second input terminal IN2 of the word oriented switch WSW, and the received words are switched through the word oriented switch SWS on word level and outputted from a second output terminal OUT2 to the public transmission network over terminal circuits or equivalents.

Although the above prior art arrangement makes it possible to improve the bandwidth capacity utilization of the public transmission network, it still has a number of drawbacks. First of all, two different switches have to be operated to set up subrate connections. Second, the subrate traffic first has to be switched through the ordinary word oriented switch, through the bit oriented switch and then back to the word oriented switch, and once again switched through the word oriented switch. This naturally leads to substantial delays of the traffic. In addition, the input and output terminals of the ordinary switch that are connected to the bit oriented switch can not be used for normal rate traffic.

U.S. Pat. No. 5,453,985 discloses a general digital switch for a PCM transmission system for switching PCM words on both word and bit level. The general switch comprises a word oriented switch and a bit oriented switch, the bit oriented switch being connected in series with the word oriented switch with a connection from the bit oriented switch back to the word oriented switch.

U.S. Pat. No. 4,718,058 discloses a complicated multistage switching network with a plurality of switching stages connected in series with each other. In the multi-stage switching network the input and output stages are arranged to switch on bit level.

SUMMARY

The present invention overcomes these and other drawbacks of the prior art arrangements.

It is a general object of the present invention to provide a general switch which supports word oriented switching as well as bit oriented subrate switching. Furthermore, it is advantageous if the set up of subrate connections through the general switch is simple, and the traffic delay for subrate traffic is reduced to a minimum.

Another object of the invention is to provide a general switch which supports normal rate and subrate switching, and which is scaleable with regard to switching capacity. In particular, it is desirable to provide such a general switch in modular form since modular arrangements have advantages with regard to costs and flexibility. In addition, relatively high subrate switching capacities such as 32K or more should be easy to realize with such a modular switch.

Still another object of the invention is to provide a switching method in a general switch which supports normal rate and subrate switching, and according to which the set up of subrate connections is simple, and the traffic delay for subrate traffic is minimized.

These and other objects are met by the invention.

In accordance with a general inventive concept there is provided a general switch in which a word oriented switch and a bit oriented switch are connected such that a common input signal is provided to both of the switches. The common input signal comprises data appearing in time slots. The general switch further comprises means for establishing, for each one of a number of outgoing time slots used for traffic, at least one of a first connection path through the word oriented switch and a second connection through the bit oriented switch, and means for selecting, for each outgoing time slot, data from an established one of the connection paths.

In a preferred embodiment of the invention, for each outgoing time slot, the establishing means establishes only one of the first connection path and the second connection path and the selecting means selects data from the established connection path.

In this way, a dual mode general switch is provided, in which word oriented switching is performed in a first operation mode and bit oriented switching is performed in a second operation mode.

A major advantage of the solution according to the invention is that the traffic delay for subrate traffic is substantially reduced compared to prior art arrangements.

To set up a subrate connection through the general switch it is consequently sufficient to establish a connection path only through the bit oriented switch and not through the word oriented switch. In this way the set up of subrate connections is also simplified.

Other advantages offered by the present invention will be appreciated upon reading of the below description of the embodiments of the invention.

BRIEF DESCRIPTION OF THE DRAWINGS

The novel features believed characteristic of the invention are set forth in the appended claims. The invention itself, however, as well as other features and advantages thereof will be best understood by reference to the detailed description of the specific embodiments which follows, when read in conjunction with the accompanying drawings, wherein:

DETAILED DESCRIPTION

Throughout the disclosure, the term switch should be interpreted as a communication switch.

Figure 3:
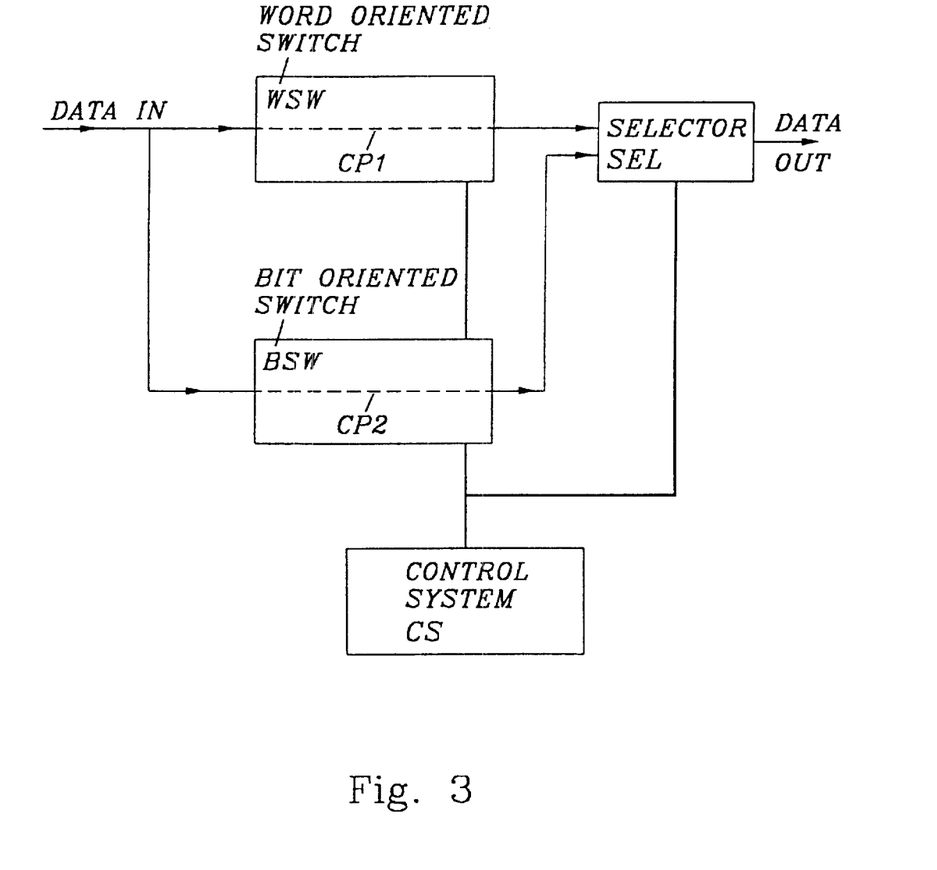
FIG. 3 is a schematic diagram illustrating an example of the overall structure of a general switch according to the invention.

FIG. 3 is a schematic diagram illustrating an example of the overall structure of a general switch according to the invention. The general switch comprises a word oriented switch WSW, a bit oriented switch BSW, a controllable selector SEL and an associated control system CS. Incoming data DATA IN to the general switch generally appear in time slots that are arranged in frames in a conventional manner. The incoming data DATA IN is generally in the form of normal rate traffic and subrate traffic. For subrate traffic each time slot is normally reserved for a specific subrate channel such that only a portion of the bit positions in the time slot is occupied.

The general switch is configured such that at least part of the incoming data DATA IN is provided to both the word oriented switch WSW and the bit oriented switch BSW in a common input signal. For each one of a predetermined number of outgoing time slots, a first potential connection path CP1 through the word oriented switch WSW and a second potential connection path CP2 through the bit oriented switch BSW are defined.

For each one of the predetermined outgoing time slots, the control system CS generally establishes at least one of the first connection path CP1 and the second connection path CP2, and the selector SEL, preferably controlled by the control system CS, selects data from an established one of the connection paths as outgoing data DATA OUT.

Of course, it is not necessary to establish a connection path if the time slot is not used for traffic.

Preferably, only one of the connection paths CP1 and CP2 is established for each outgoing time slot, and the outgoing data DATA OUT is then selected from the established connection path. When data in a time slot provided to the switches WSW and BSW is in the form of subrate traffic, the control system CS establishes the second connection path CP2 through the bit oriented switch BSW in which the subrate traffic channels are switched on bit level and packed into new time slots, and the selector SEL is controlled to select data from the bit oriented switch BSW. When data in a time slot provided to the switches WSW and BSW is in the form of normal rate traffic, the control system CS establishes the first connection path CP1 through the word oriented switch WSW in which the normal rate traffic channels are switched on word level, and the selector SEL is controlled to select data from the word oriented switch WSW. It is advantageous to switch data through the word oriented switch WSW whenever possible, since hardware for word oriented switching normally dissipates substantially less power compared to hardware for corresponding bit oriented switching.

In this way, a dual mode general switch is provided. Word oriented switching for normal rate traffic is performed in a first operation mode in which the first connection path CP1 is established and in which the selector SEL selects data from the word oriented switch WSW. Bit oriented switching for subrate traffic is performed in a second operation mode in which the second connection path is established, and in which the selector SEL selects data from the bit oriented switch BSW.

It is consequently sufficient to set up a subrate connection in the general switch by establishing a connection path through the bit oriented switch BSW, and selecting data therefrom.

However, it is of course possible to establish the first connection path CP1 as well as the second connection path CP2 for each time slot, and select data from a predetermined one of the established connection paths.

In some sense, one could say that the word oriented switch WSW and the bit oriented switch BSW are parallel to each other.

Normally, the word oriented switch WSW has an input terminal for receiving the common input signal which comprises data in the form of words, means for selectively switching words in the common input signal on word level, and an output terminal connected to the switching means for outputting words. The common input signal is also distributed to an input terminal of the bit oriented switch BSW. The bit oriented switch preferably comprises means for selectively switching bits of the words in the common input signal to form new words, and an output terminal connected to the second switching means for outputting the new words. The selector SEL is connected to the output terminal of the word oriented switch WSW and the output terminal of the bit oriented switch BSW for selecting, for each outgoing time slot, a word switched through the word oriented switch or a new word from the bit oriented switch, and outputting the selected word.

Figure 4:
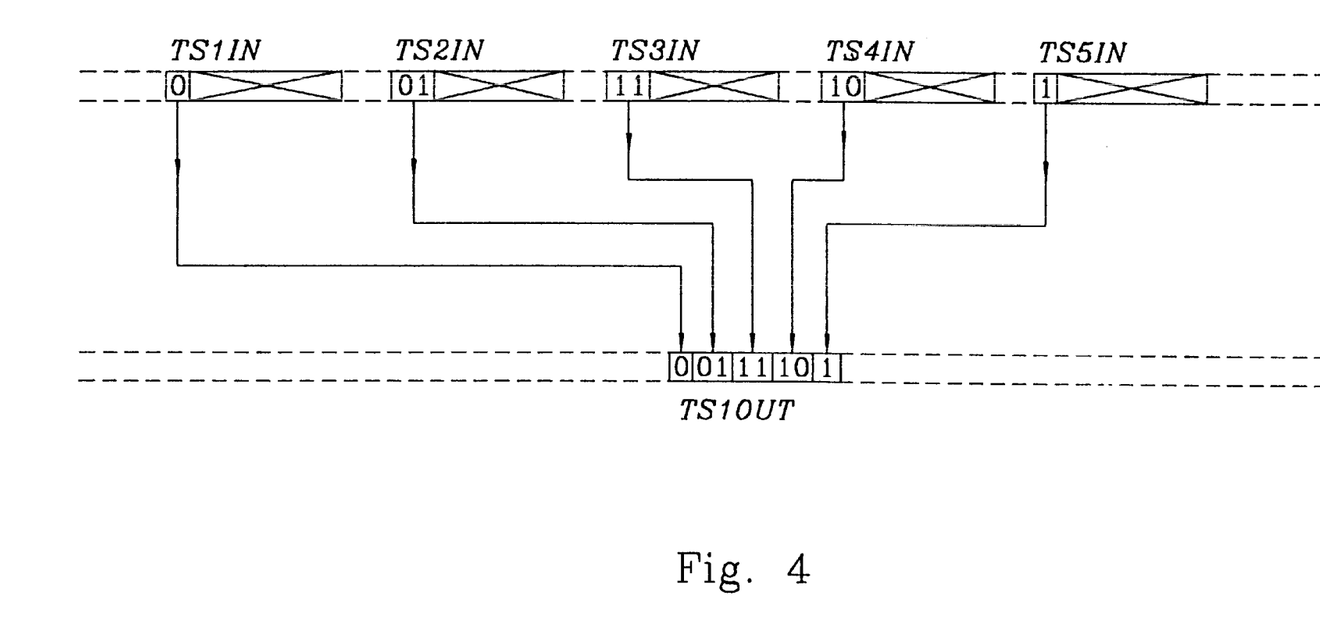
FIG. 4 is a schematic diagram which shows an example of how a number of subrate channels in different incoming time slots are packed into a new word in an outgoing time slot in a bit oriented switch.

FIG. 4 is a schematic diagram which shows an example of how a number of subrate channels in different incoming time slots are packed into a new word in an outgoing time slot in the bit oriented switch BSW. Five incoming time slots TS1IN to TS5IN from components in a communication network reaches the bit oriented switch BSW. In this particular example, each one of the incoming time slots TS1IN to TS5IN is reserved for one subrate channel. Each one of the subrate channels in the time slots TS2IN, TS3IN, TS4IN occupies only two of the bit positions of the corresponding time slot, and each subrate channel in the time slots TS1IN and TS5IN occupies only one bit of the bit positions. In the bit oriented switch BSW, the subrate channels in the incoming time slots TS1IN to TS5IN are combined to form a new word, 00111101 in this example, in the outgoing time slot TS1OUT. The outgoing time slot TS1OUT is fully packed to maximally utilize the bit positions of the outgoing time slot.

Although packing of subrate channels has been described above, it should be understood that the invention is also applicable to unpacking of subrate channels. The principle of unpacking subrate channels can be understood by once again referring to FIG. 1. Now, consider traffic from the mobile switching center MSC towards the base station controller BSC and subsequently from the base station controller BSC to a number of mobile units MOBILE via base stations BS. Assuming that a time slot contains a number of subrate channels, and that the subrate channels are bound for different mobile units MOBILE, then the subrate channels have to be unpacked in the base station controller BSC before being sent to the corresponding base stations BS and subsequently to the mobile units MOBILE. Accordingly, the incoming data to the base station controller BSC have to be processed on bit level in a bit oriented switch in order to switch the subrate channels of a time slot into several different time slots. In the following, however, the description of bit oriented switching will be concerned with the direction from subrate to normal rate.

It should also be understood that, in general, the bit oriented switch BSW performs a controlled change of bit position and/or word of selected bits in received words to form new words that are outputted in outgoing time slots. It is consequently possible to change bit position of one or more selected bits within the same word, or change bit position and word of a selected bit in a word. Traffic channels occupying at least one bit of a word in a time slot can be dynamically allocated required space in new words such that it becomes possible to define traffic channels that occupies anything from one up to eight or more bit positions in a word.

For a better understanding of the invention, an illustrative example of general switch according to the invention will now be described in more detail.

Figure 5:
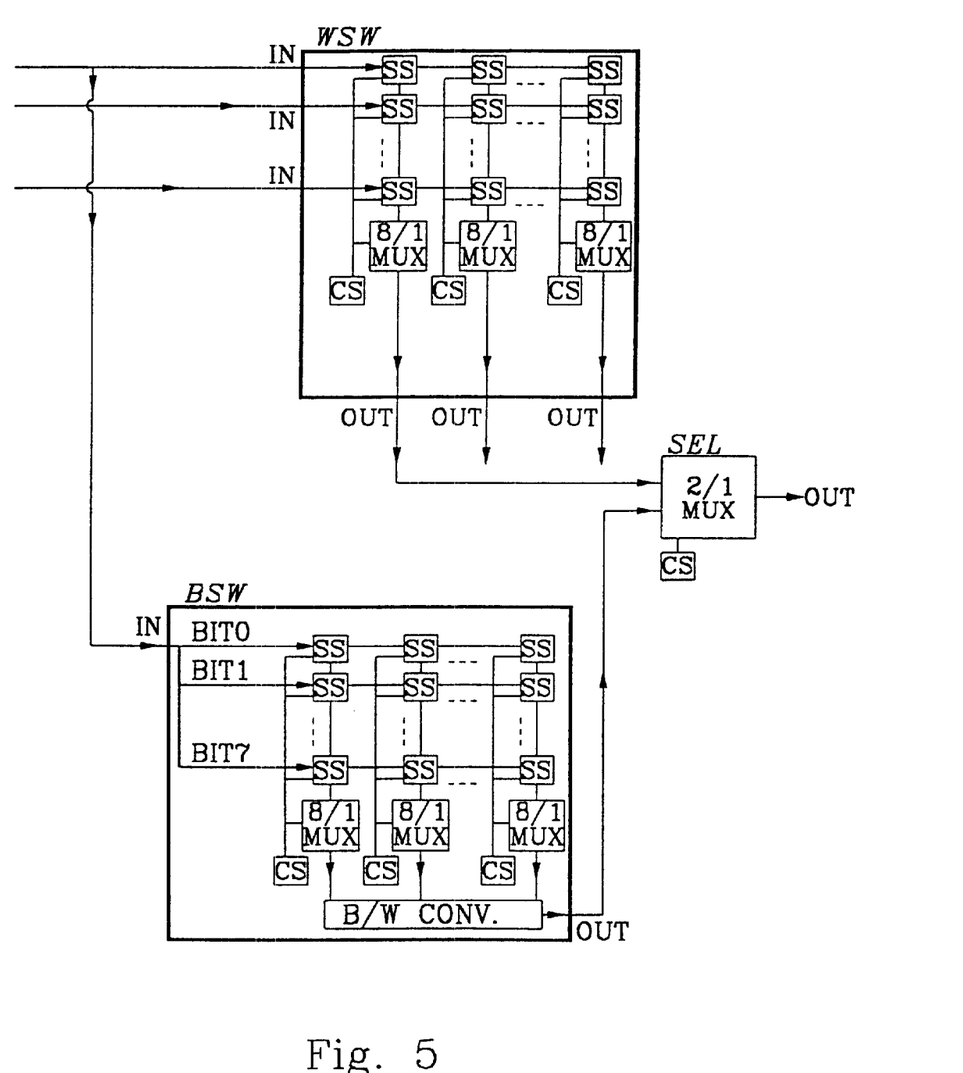
FIG. 5 is a schematic diagram of an illustrative example of a general switch according to a first embodiment of the invention.

FIG. 5 is a schematic diagram of an illustrative example of a general switch according to a first embodiment of the invention. The general switch comprises a word oriented switch WSW, a bit oriented switch BSW and a controllable selector SEL. Of course, as will be understood by those skilled in the art, the overall general switch also includes auxiliary devices such as a control system (not shown) and a clock and synchronization signal generating system (not shown).

In this particular example, the word oriented switch WSW is a time-space switch. It should however be understood that this example is not intended to limit the scope of the invention, since it is possible to utilize other types of switches.

The word oriented switch WSW of FIG. 5 basically comprises a matrix of speech stores SS in which data in the form of user information is stored. The word oriented switch WSW further comprises multiplexors 8/1 MUX and control stores CS that are associated with the speech stores SS. The word oriented switch WSW has a number of input terminals IN connected to a number of input lines, and a number of output terminals OUT connected to a number of output lines. The user information is provided in data signals to the input terminals IN and subsequently to the speech stores SS. Each speech store SS in a given row of the speech store matrix is connected to the same input terminal such that all speech stores SS in that row receives the same set of data.

Furthermore, each column of speech stores SS is associated with a respective control store CS which controls the read-out of data from each one of the speech stores SS in the column. The read-out of data from the speech stores SS gives the word oriented time-space switch WSW its time-switching functionality.

Each column of speech stores SS is also associated with a respective controllable multiplexor 8/1 MUX such that each speech store SS in the column is connected to the multiplexor 8/1 MUX. In FIG. 5, for simplicity and in order to facilitate the reading of the drawing, a single line is shown to interconnect all the speech stores SS of a column with a common multiplexor 8/1 MUX. However, it should be understood that there is a separate connection from each speech store SS in the column to the multiplexor MUX. The multiplexor 8/1 MUX is connected to and controlled by the corresponding control store CS, and the multiplexor 8/1 MUX determines from which speech store SS in the column that data should be read in response to control information stored in the control store CS. The output terminals OUT act as an interface between the multiplexors MUX and the external output lines. The a controllable multiplexors 8/1 MUX give the word oriented time-space switch WSW its space-switching functionality.

Assuming, as an example, that the word oriented time-space switch WSW has 8 input lines and 8 output lines with a 8×8 matrix of speech stores SS, and that each input line handles 8192 time slots and that each speech store SS has 8192 positions, the result will be a traditional 64K time-space switch unit.

Throughout the disclosure, when a 1 K switch is mentioned, it actually means a switch unit of 1024 multiple positions (MUP). In the same way, a 64 K switch means a switch unit of 65536 multiple positions.

In the example of FIG. 5, the bit oriented switch BSW is also a time-space switch. The bit oriented switch BSW is similar to the word oriented switch WSW when it comes to the overall hardware configuration. The bit oriented switch BSW comprises a matrix of speech stores SS, and associated multiplexors 8/1 MUX and control stores CS. The bit oriented switch BSW is further equipped with an input terminal IN and an output terminal OUT. The bit oriented switch BSW also comprises a word-to-bits disassembler connected to the input terminal IN of the bit oriented switch BSW for disassembling words in the time slots received by the input terminal IN to bit level such that each word is divided into a number of separate bits BIT0 to BIT7. For each disassembled word, each row in the speech store matrix receives a predetermined one of the bits of the word such that the bit is stored in all speech stores in the row.

The speech stores SS in the bit oriented switch BSW are preferably identical to those of the word oriented switch WSW, although only single bits are stored in the storage positions. In this way, it is possible to utilize the same hardware as well as similar or identical software and maintenance routines for the word oriented switch WSW and the bit oriented switch BSW. However, as an alternative, the speech stores SS in the bit oriented switch BSW could be prepared to store bits instead of entire words in the storage positions.

As mentioned above, it is desirable to use the same hardware for the word oriented switch WSW and the bit oriented switch BSW. In using identical hardware for word oriented and bit oriented switching, it should however be clear that the word oriented switch is 8 times more effective in switching since it switches 8 bits at a time compared to a single bit a time for the bit oriented switch; assuming that each word contains 8 bits. In the word oriented switch WSW, each control store position selects 8 bits at a time. In the case of the bit oriented switch BSW, each control store position only selects a single bit. As a consequence, the switching capacity of the word oriented switch WSW is 8 times that of the bit oriented switch BSW. Assuming that the word oriented switch WSW has a capacity of 64K and each word is capable of containing 8 bits, the bit oriented switch BSW will have a capacity of 8K.

In the bit oriented switch BSW, the multiplexors 8/1 MUXs controlled by the associated control stores CS are operative to output selected bits from the speech stores SS. The selected output bits of the multiplexors 8/1 MUX in the bit oriented switch BSW are combined in a bits-to-word converter B/W CONV into a new word which is outputted at the output terminal OUT.

In operation, data signals are provided to the input terminals of the word oriented switch WSW. The data signal to a predetermined input terminal of the word oriented switch WSW is also distributed to the input terminal of the bit oriented switch BSW such that the input terminal of the bit oriented switch BSW is continuously supplied with the same incoming time slots as this predetermined input terminal of the word oriented switch WSW.

According to a preferred embodiment of the invention, for each outgoing time slot, the control system (not shown in FIG. 5) establishes a connection path either through the word oriented switch WSW or the bit oriented switch BSW in dependence on the type of traffic (normal rate/subrate) in the time slot. The selector SEL is controlled to select data from the established connection path, and forward the selected data as outgoing data at the output terminal of the selector SEL.

It should however be clear that data in the other data signals to the remaining input terminals of the word oriented switch WSW are switched on word level as normal in the word oriented switch WSW.

The control system normally establishes a connection path by setting the appropriate control stores CS in the switch in question so as to control the read out of data stored in the switch and create a circuit between a predetermined input multiple position and a predetermined output multiple position of the switch. Normally, the setting of the control stores includes writing control information to the control stores CS. This control information controls the read out of data from the speech stores SS in the switch.

Preferably, the controllable selector SEL includes a 2/1 multiplexor MUX controlled by an associated control store CS. The multiplexor 2/1 MUX is connected to a predetermined output terminal of the word oriented switch WSW and to the output terminal of the bit oriented switch BSW. The control store CS associated with the 2/1 MUX in the selector holds specific control information which controls the selecting operation of the 2/1 MUX.

If a connection path through the bit oriented switch BSW is established and the 2/1 MUX in the selector SEL is set to forward data from the output terminal of the bit oriented switch BSW, subrate switching is supported by the general switch. On the other hand, if a connection path through the word oriented switch WSW is established and the 2/1 MUX is set to forward data from the predetermined output terminal of the word oriented switch WSW, then normal word oriented switching is supported by the general switch. In this way, subrate switching as well as normal switching are supported by the general switch.

Figure 6:
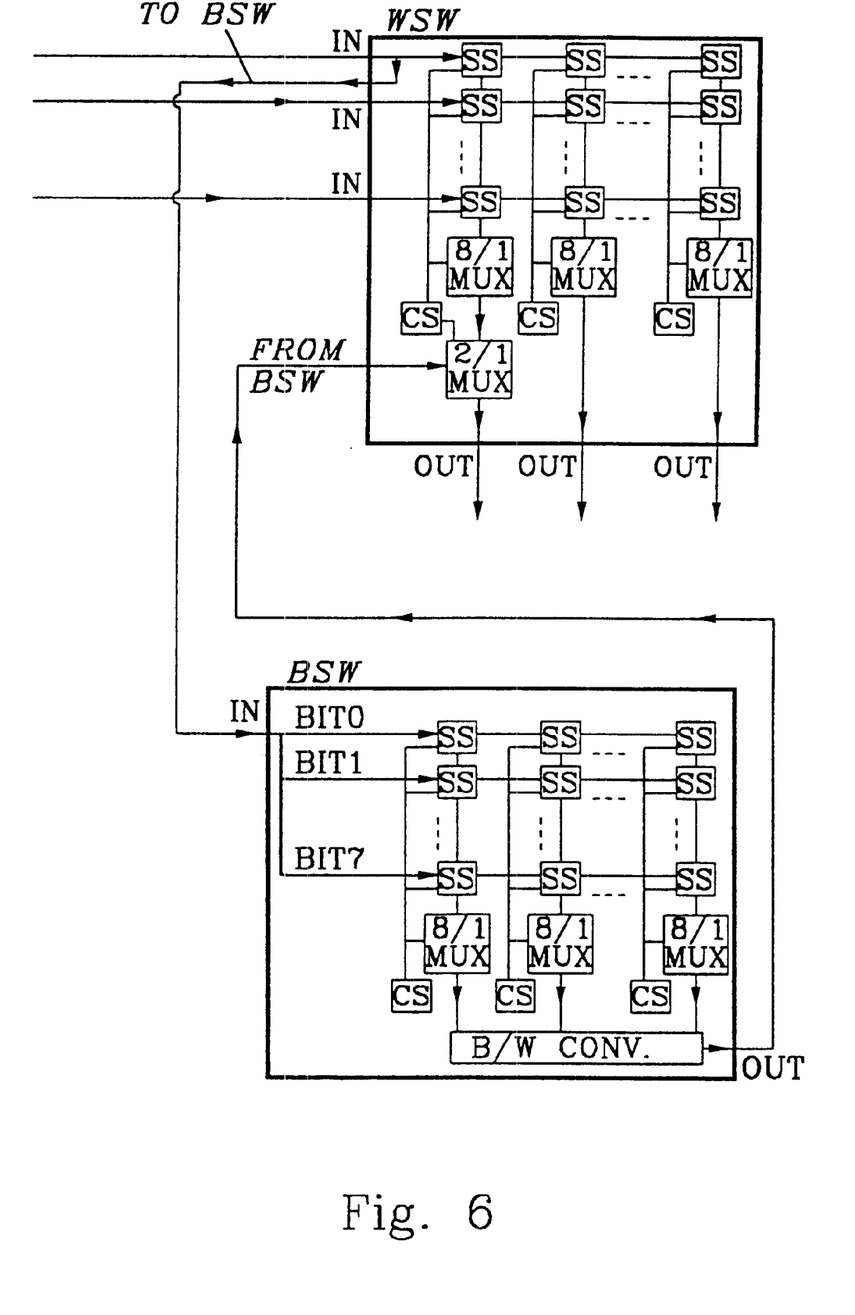
FIG. 6 is a schematic diagram of an illustrative example of a general switch according to a second embodiment of the invention.

FIG. 6 is a schematic diagram of an illustrative example of a general switch according to a second embodiment of the invention. The general switch of FIG. 6 is similar to that of FIG. 5. However, as can be seen in FIG. 6, the selector, in the form of a 2/1 multiplexor, is now integrated into the word oriented switch WSW. The multiplexor 2/1 MUX is connected to the output of a predetermined one of the multiplexors 8/1 MUXs in the word oriented switch WSW and to the output terminal of the bit oriented switch BSW. The multiplexor 2/1 MUX is preferably controlled by additional control information stored in the control store CS associated with the predetermined 8/1 multiplexor MUX. Furthermore, the data signal common to the word oriented switch WSW and the bit oriented switch BSW is now distributed to the bit oriented switch BSW from a connection point inside the word oriented switch WSW.

Figure 7:
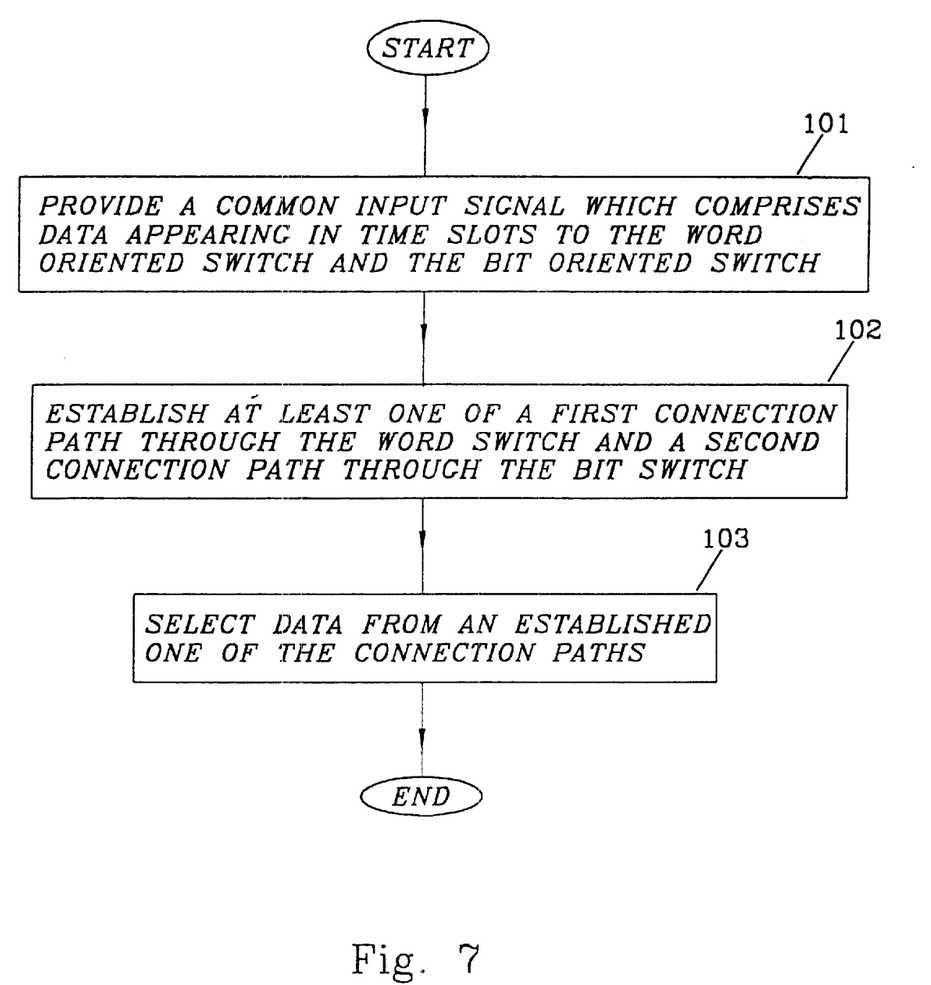
FIG. 7 is a flow diagram of a switching method according to the invention.

FIG. 7 is a flow diagram of a switching method according to the invention. The flow diagram of FIG. 7 relates to a method for switching data appearing in time slots in a general switch which comprises a word oriented switch and a bit oriented switch. The method is executed on a per time slot basis. In step 101, a common input signal which comprises data appearing in time slots is provided to the word oriented switch and the bit oriented switch. In step 102, at least one of a first connection path through the word oriented switch and a second connection path through the bit oriented switch is established for an outgoing time slot. Next, in step 103, data is selected, for the outgoing time slot, from an established one of the connection paths. Preferably, only one of the connection paths is established, and data is then selected from the established connection path.

In the preferred embodiment of the invention, the word oriented switch and the bit oriented switch are time-space switches. Time-space (TS) switches are inherently strictly non-blocking, which of course is advantageous. Another advantage of time-space switches is the simple path selection, since from a given multiple position at the output to a given multiple position at the input there is only one path, and this path is always available for the connection between these multiple positions.

However, because of the huge amount and the complexity of internal connections between speech stores, control stores and multiplexors in a time-space switch, the time-space switch is generally considered indivisible and non-modular. Conventional large word oriented TS-switches have a capacity of 128 K, although state-of-the-art TS-switches have reached up to 216 K when the technology is stretched to its limits, squeezing as many components and cable connections as possible into the same rack. State of the art bit oriented TS-switches have a maximum capacity of 16 to 24K. In many telecommunication applications, higher word and bit switching capacities are required, rendering the conventional TS-switch structure insufficient.

According to the invention there is provided a modular general time-space switch which is based on dual mode switch modules such as the switches illustrated in FIGS. 5 and 6.

The general idea of making the overall general switch modular resides in that part of the space switch functionality of the TS-switch core is broken out and arranged in groups of switch adapter boards, and the TS-switch core itself is divided into a matrix of smaller and independent time-space switch modules or switch units that are associated with the switch adapter boards. Each group of switch adapter boards is co-operating with a predetermined row of switch modules for input of data to the modules, and with a predetermined column of switch modules for output of data from the modules. In this way, it is possible to implement the time-space switch structure into a number of subracks with a reasonable number of interconnections between different subracks, thus obtaining a truly modular TS-switch structure. The modularity of the switch means that relatively small building blocks are handled such that the technical complexity never rises to unreasonable levels.

A modular switch has advantages with regard to costs and flexibility. As an example, it is possible to start with a small switch with a single switch module or just a few modules to a relatively low cost. If the need for more capacity at a subsequent stage arises, then an appropriate number of further switch modules are easily added so as to make the overall switch bigger. In this way, the effective cost will correspond closely to the actual capacity demand. In addition, similar or identical software and maintenance routines may be utilized for switches of all sizes, since the primary building blocks, i.e. the dual mode switch modules and the switch adapter boards, are the same.

In the following, switch adapter boards will also be referred to as switch adapter units. Since it is possible to arrange a complete group of switch adapter boards onto a single circuit board, the term switch adapter unit might be more suitable than the term switch adapter board. However, when each switch adapter unit is provided on a single circuit board, the term switch adapter board is of course appropriate.

Figure 8:
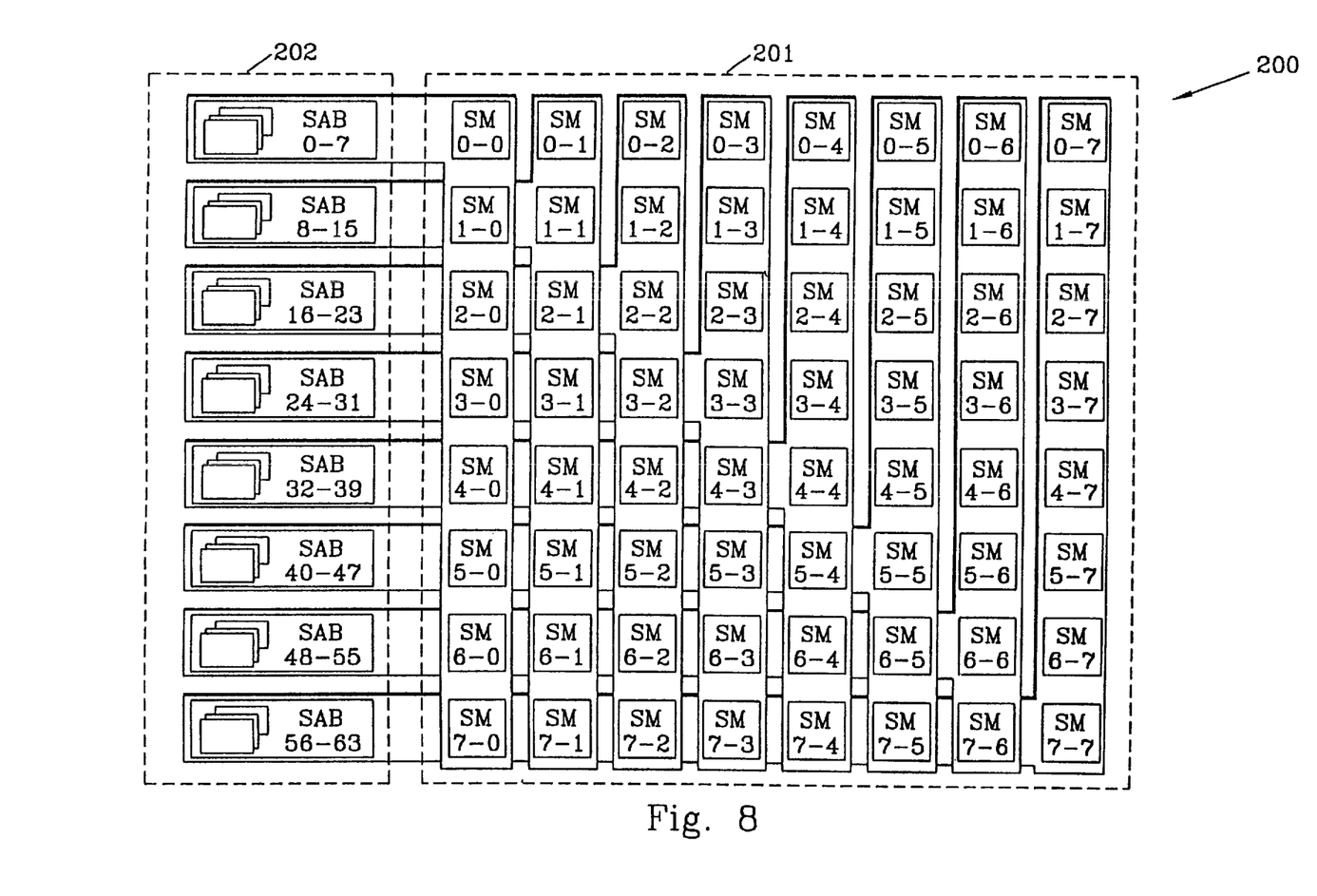
FIG. 8 is a schematic diagram of an illustrative example of the switch structure of a modular general switch according to the invention.

FIG. 8 is a schematic diagram of an illustrative example of the switch structure of a modular general switch according to the invention. The switch structure 200 comprises a matrix 201 of switch modules SM0-0 to SM7-7, and a number of switch adapter boards 202 arranged in groups SAB0-7, SAB8-15, . . . , SAB56-63. Each group of switch adapter boards is associated with a predetermined row of switch modules SM in the matrix 201 for inputting data to these switch modules SM. Each group of switch adapter boards is also associated with a predetermined column of switch modules SM in the matrix 201 for output of selected data from the switch modules SM in the column. The switch adapter boards SAB generally act as input interface as well as output interface of the switch structure 200.

Of course, as will be understood by those skilled in the art, the overall general switch not only includes the modular switch structure but also auxiliary devices such as a control unit (not shown) and a clock and synchronization signal generating system (not shown).

The switch modules SM0-0 to SM7-7 are indicated schematically in FIG. 8, but it should be understood that each switch module SM is configured with a word oriented time-space switch unit, a bit oriented time-space switch unit and a controllable selector such that normal rate switching as well as subrate switching are supported. An example of a detailed configuration of the switch modules will be described later with reference to FIG. 9.

The association of each group of switch adapter boards with a respective predetermined column of switch modules is indicated in FIG. 8, where each group of switch adapter boards is enclosed together with its corresponding column of switch modules SM by solid lines. The bold lines in FIG. 8 are provided only to facilitate the reading of the drawing. The association of each group of switch adapter boards with a respective predetermined row of switch modules is quite straightforward and therefore not indicated in FIG. 8.

Figure 9:
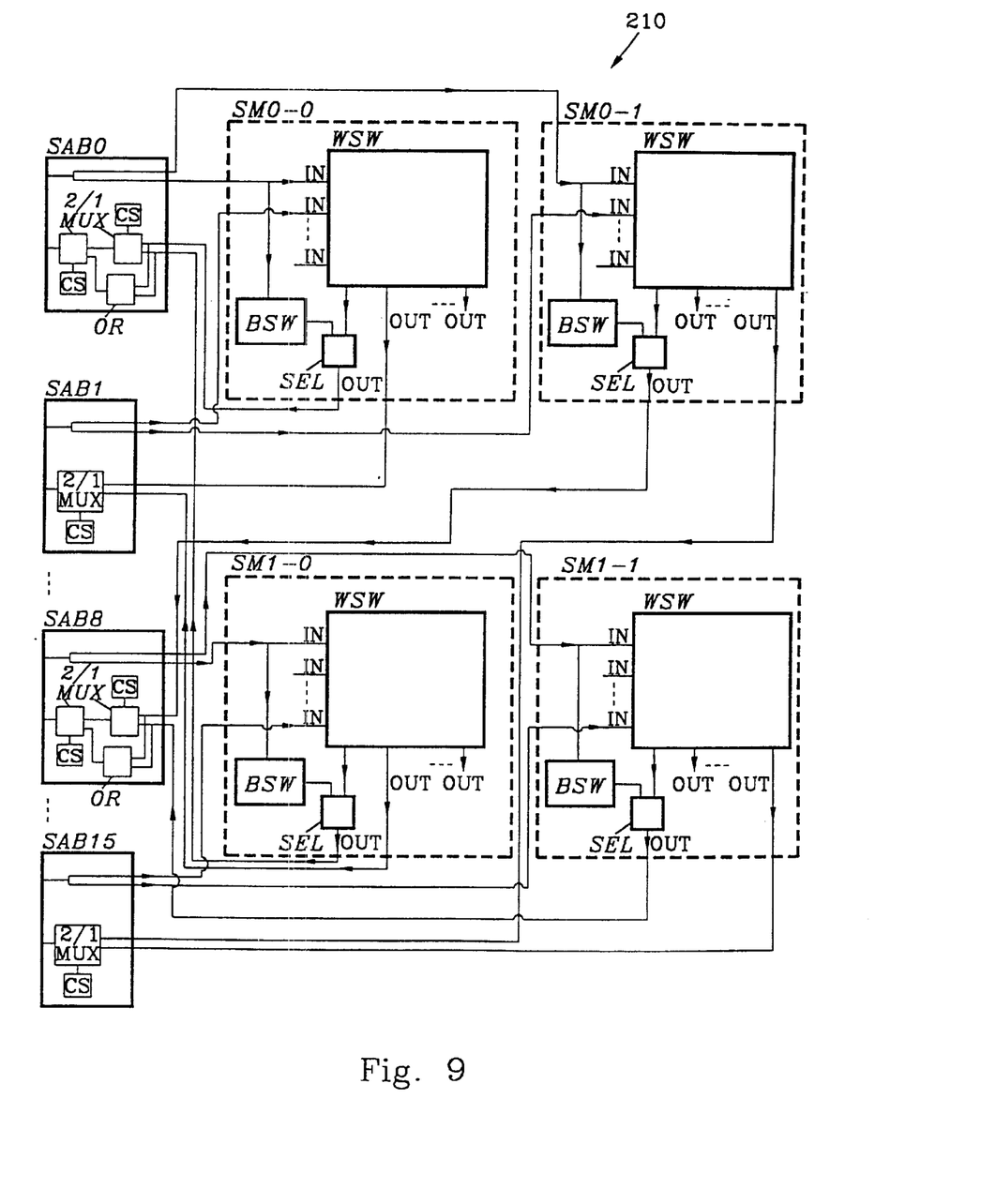
FIG. 9 is a more detailed schematic diagram of an illustrative example of a modular switch structure according to the invention.

FIG. 9 is a more detailed schematic diagram of an illustrative example of a modular switch structure according to the invention with a 2×2 matrix of switch SM15-1 modules. The switch structure 210 comprises four switch modules SM0-0 to SM1-1 arrangeable as a 2×2 matrix and 16 switch adapter boards SAB0 to SAB15. For simplicity, only the switch adapter boards SAB0, SAB1, SAB8 and SAB15 are illustrated. The switch adapter boards SAB0 to SAB15 are arranged into two groups with 8 boards in each group; SAB0-SAB7 in a first group and SAB8-SAB15 in a second group. Each switch module SM includes a word oriented switch WSW, a bit oriented switch BSW and a controllable selector SEL. In this example, the word oriented switch WSW is a 64K TS-switch unit, preferably similar to the word oriented switch illustrated in FIG. 5, and the bit oriented switch BSW is a 8K TS-switch unit, preferably similar to the bit oriented switch illustrated in FIG. 5.

The first group of adapter boards SAB0-7 is associated with the first row of switch modules SM0-0 and SM0-1, and each switch adapter board SAB in that group is associated with a respective predetermined input terminal position of the word oriented switches WSW in the switch modules SM0-0 and SM0-1 for transferring data from the switch adapter board SAB to the speech stores that are associated with that input terminal position. Correspondingly, the second group of adapter boards SAB8-15 is associated with the second row of switch modules SM1-0 and SM1-1. Each switch adapter board SAB of the second group SAB8-15 is associated with a respective predetermined input terminal position of the word oriented switches WSW in the switch modules SM1-0 and SM1-1 for transferring data to the speech stores associated with that input terminal position.

In this particular example, each switch adapter board SAB comprises an input interface which receives a signal stream of time-multiplexed data. The input interface is connected to a distribution point which in turn is connected to the word switch input terminals IN at a predetermined input terminal position, and distributes the multiplexed data thereto such that all speech stores, in each word oriented switch WSW in the associated row of switch modules, that are connected to an input terminal IN at that position receives the multiplexed data.

With reference to FIG. 9, it can be seen that the distribution point of the switch adapter board SAB0 is connected to the first input terminal of the word oriented switch WSW in the switch module SM0-0 as well as the first input terminal of the word oriented switch WSW in the switch module SM0-1. The distribution point of SAB1 is connected to the second input terminal of the word oriented switches WSW in SM0-0 and SM0-1. The distribution point of SAB8 is connected to the first input terminal of the word oriented switches WSW in SM1-0 and SM1-1, and the distribution point of SAB15 is connected to the last input terminal of the word oriented switches WSW in SM1-0 and SM1-1. In each switch module SM, the bit oriented switch BSW is connected to receive the same input signal as a predetermined one of the input terminals IN of the associated word oriented switch WSW. The selector SEL is connected to the output terminal of the bit oriented switch BSW and a predetermined one of the output terminals of the associated word oriented switch WSW for selecting words from that output terminal of the word oriented switch WSW or words formed by the bit oriented switch BSW. For each outgoing time slot, the control system (not shown) of the overall general switch will preferably establish a connection path through the word oriented switch WSW or through the bit oriented switch BSW. If data to be assigned to the outgoing time slot is associated with normal rate traffic, the control system will establish a connection path through the word oriented switch. On the other hand, if the data to be assigned to the outgoing time slot is associated with subrate traffic, the control system will establish a connection path through the bit oriented switch BSW.

Furthermore, each bit oriented switch BSW comprises equipment for setting the value of the output bits that are not associated with currently established connections to logical zero. Preferably, the control stores CS in the bit oriented switch BSW comprises, for each data bit, a busy bit which indicates if the corresponding data bit is currently used for traffic or not, i.e. if the data bit is active or inactive. Normally, the busy bit is "1" if the corresponding data bit is active and "0" if the data bit is inactive. As an example, the bit oriented switch BSW of FIG. 6 could additionally be provided with a number of AND-gates, each of which would be associated with a respective 8/1 MUX and corresponding control store CS. Each AND-gate would then be connected to receive the output of the associated 8/1 MUX and the corresponding busy bit from the control store CS, and the output of the AND-gate would be connected to the B/W-converter. currently established connections, i.e. inactive bits, would be set to logical zero. The reason for this will be explained later on.

Each group of switch adapter boards is also associated with a predetermined column of switch modules SM in the matrix. The first group of switch adapter boards SAB0-7 is associated with the first column of switch modules SM0-0 and SM1-0, and each switch adapter board SAB in that group is associated with a respective predetermined output terminal position of the word oriented switches in the switch modules SM0-0 and SM1-0 for fetching data from the output terminals OUT or, where appropriate, the output terminal of the selector SEL at that position. Correspondingly, the second group of adapter boards SAB8-15 is associated with the second column of switch modules SM0-1 and SM1-1. Each switch adapter board further comprises a space-switching functionality unit in the form of a controllable multiplexor 2/1 MUX and an associated control store CS. The space-switching functionality multiplexor 2/1 MUX is connected to the output terminals OUT, at a predetermined output terminal position, of the word oriented switch WSW that are not connected to the selector SEL, or to the output terminal OUT of the selector SEL for receiving data therefrom. The control store CS holds control information which controls the multiplexor 2/1 MUX.

A predetermined switch adapter board (SAB0 in the group SAB0-7, and SAB8 the group SAB8-15) in each group of switch adapter boards is connected to receive the selected words from the selectors SEL in the associated column of switch modules SM. These predetermined switch adapter boards SAB0 and SAB8 act as input and output interface for traffic to be switched on bit level.

The predetermined switch adapter board in each group of switch adapter boards is further equipped with an OR-gate for performing a bit-wise OR-operation on the selected words. The space-switching functionality multiplexor 2/1 MUX in that switch adapter board receives data from the switch modules SM in the associated column, and the same data is distributed to the OR-gate.

Preferably, the predetermined switch adapter board also includes an additional multiplexor 2/1 MUX connected to the output terminal of the space-switching functionality multiplexor 2/1 MUX in the switch adapter board and the output terminal of the OR-gate for selecting words from the space-switching functionality multiplexor 2/MUX or words from the OR-gate as output.

For subrate switching, when words from the associated bit oriented switches BSW are sent to the predetermined switch adapter board by the corresponding selectors SEL, the result of the OR-operation from the OR-gate will be forwarded as switch adapter board output by the additional multiplexor 2/1 MUX in the switch adapter board. Since output bits that are not associated with established connections are set to "0", the relevant output bits will pass through the OR-gate. In this way, subrate switching for modular switch structures is successfully implemented.

For each switch module, the input terminals IN of the word oriented switch WSW and the input terminal IN of the bit oriented switch BSW act as an input interface of the switch module SM. The output terminals OUT of the word oriented switch WSW, except for the one connected to one of the input terminals of the controllable selector SEL, and the output terminal of the controllable selector SEL act as an output interface of the switch module SM.

The switch adapter boards generally constitute the output interface of the overall general switch. In particular, the output terminals of the space-switching functionality multiplexors 2/1 MUX in the switch adapter boards SAB1-7 and SAB9-15, and the output terminals of the additional multiplexor 2/1 MUX in the predetermined switch adapter boards SAB0 and SAB8 act as output terminals of the general switch.

Although the selectors SEL are not illustrated as integrated in the word oriented switches WSW in FIG. 9, it should be understood that such an integrated solution is also possible. In that case, the switch modules are configured as the general switch illustrated in FIG. 6.

For a better understanding of the operation of the modular switch structure of FIG. 9, an illustrative example of how traffic is switched on bit level in the switch structure will be described below with reference to FIG. 10.

Figure 10:
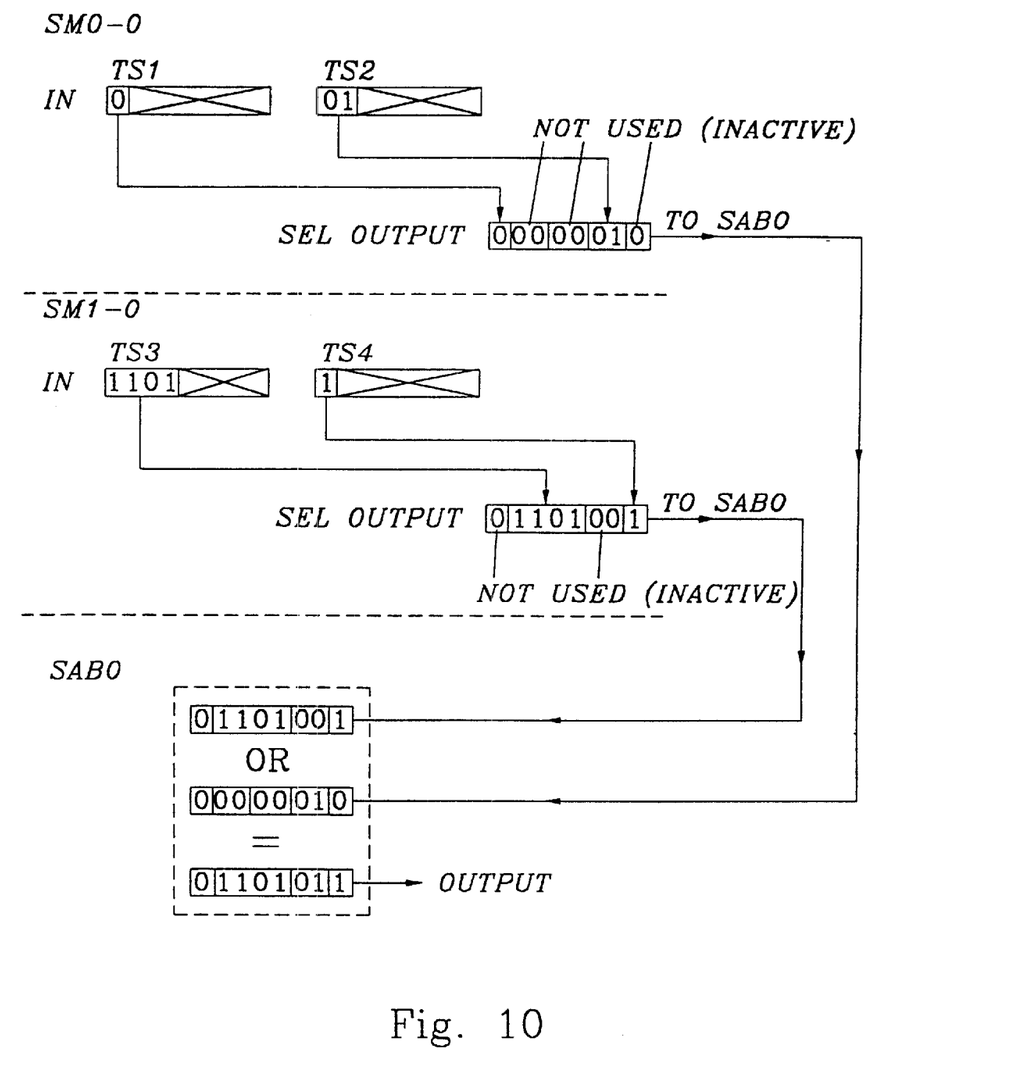
FIG. 10 is a schematic diagram illustrating an example of how traffic is switched on bit level through the switch structure of FIG. 9.

FIG. 10 is a schematic diagram illustrating an example of how traffic is switched on bit level through the switch structure of FIG. 9. The switch module SM0-0 receives two time slots TS1 and TS2 comprising subrate traffic data. Preferably, these time slots are supplied to the switch module from the switch adapter board SAB0. The data in the time slots are switched through the bit oriented switch BSW in the switch module SM0-0 to form a first new word in which bits that are currently not used for traffic are set to "0". This new word is forwarded from the selector SEL to the switch adapter board SAB0 as illustrated in FIG. 9 and 10. The switch module SM1-0 receives two time slots TS3 and TS4 comprising subrate traffic data. Preferably, these time slots are supplied to the switch module from the switch adapter board SAB8. The data in the time slots are switched through the bit oriented switch BSW in the switch module SM1-0 to form a second new word in which bits that are currently not used for traffic are set to "0". The new word is forwarded from the selector SEL in the switch module SM1-0 to the switch adapter board SAB0.

In the switch adapter board SAB0, the new words from the selectors SEL of the switch modules SM0-0 and SM1-0 are supplied to the OR-gate (FIG. 9) and a bit-wise OR-operation is performed to generate an output word of the switch adapter board. If appropriately operated, the overall control system (not shown) controls the formation of the new words in the bit oriented switches BSW in the switch modules SM0-0 and SM1-0 such that the bits that are actively set to "0" in the first word are placed in positions that correspond to positions in the second word that are occupied by traffic data, and vice versa. In this way, the relevant output bits associated with currently established connections are forwarded as output from the switch adapter board SAB0. This principle is illustrated in FIG. 10.

In an alternative embodiment of the invention, the relevant output bits associated with currently established connections are forwarded as output from the switch adapter board SAB0 by setting the value of the output bits that are not associated with currently established connections, i.e. the so-called inactive bits, to logical one, "1", using inverted busy bits and an OR-gate in the bit oriented switch BSW instead of an AND-gate. Furthermore, the OR-gate in the predetermined switch adapter board SAB0 is then substituted by an AND-gate which forwards the relevant output bits.

The principle of designing switch structures of different sizes based on dual mode switch modules SM and switch adapter boards SAB will now be described briefly. Assume, as an example, that each switch module SM comprises a 64K word oriented switch, and an 8K bit oriented switch. Then, in order to obtain a general switch with 128K word oriented switching capacity and 16K bit oriented switching capacity, 4 dual mode switch modules SM arrangeable as a 2×2 matrix, and two groups of switch adapters SAB0-7 and SAB8-15 have to be used. For a general switch with 192K word oriented switching capacity and 24K bit oriented switching capacity, 9 dual mode switch modules SM arrangeable as a 3×3 matrix, and three groups of switch adapters SAB0-7, SAB8-15, SAB16–23 must be used. The modular switch concept according to the invention allows even larger switches. By using further dual mode switch modules SM and switch adapter boards SAB, general switches of up to 512K word switching capacity and 64K bit switching capacity or more are easily obtained. Table I below illustrates the relationship between total switch size, subrate capacity and the number of required dual mode switch modules SM and switch adapter boards SAB, assuming that each switch module has a total word switching capacity of 64K and bit switching capacity of 8K.

TABLE I

| Switch size (K) | Subrate capacity (K) | Number of dual mode switch modules | Number of switch adapter boards |
|---|---|---|---|
| 64  | 8  | 1  | 8  |
| 128 | 16 | 4  | 16 |
| 192 | 24 | 9  | 24 |
| 256 | 32 | 16 | 32 |
| 320 | 40 | 25 | 40 |
| 384 | 48 | 36 | 48 |
| 448 | 56 | 49 | 56 |
| 512 | 64 | 64 | 64 |

The embodiments described above are merely given as examples, and it should be understood that the present invention is not limited thereto. It is of course possible to embody the invention in specific forms other than those described without departing from the spirit of the invention. Further modifications and improvements which retain the basic underlying principles disclosed and claimed wherein are within the scope and spirit of the invention.

What is claimed is:

1. A general switch comprising:

a word oriented switch;

a bit oriented switch, means for providing a common input signal which comprises data appearing in time slots to said word oriented switch and said bit oriented switch;

means for establishing, for each one of a predetermined number of outgoing time slots, at least one of a first connection path through said word oriented switch and a second connection path through said bit oriented switch; and means for selecting, for each one of said outgoing time slots, data from an established one of said first connection path and said second connection path.

2. A general switch according to claim 1, wherein for each one of said outgoing time slots, said establishing means is operable to establish only one of said first connection path and said second connection path, and said selecting means is operable to select data from the established connection path.

3. A general switch according to claim 1, wherein for each one of said outgoing time slots, said establishing means is operable to establish said first connection path as well as said second connection path, and said selecting means is operable to select data from one of said established first connection path and said established second connection path.

4. A general switch according to claim 1, wherein said word oriented switch and said bit oriented switch are time-space switches.

5. A general switch according to claim 1, wherein said word oriented switch has a first input terminal for receiving said common input signal which comprises data in the form of words, first means for selectively switching words in said common input signal on word level, and a first output terminal connected to said first switching means for outputting words;

said bit oriented switch has a second input terminal for receiving said common input signal, second means for selectively switching bits of the words in said common input signal to form new words, and a second output terminal connected to said second switching means for outputting said new words; and said selecting means is connected to said first output terminal and said second output terminal for selecting words switched by said first switching means or new words formed by said second switching means and outputting said selected words.

6. A general switch according to claim 5, wherein said second means for switching bits, in operation, performs a controlled change of bit position and/or word of selected bits in received words to form said new words.

7. A general switch according to claim 1, wherein said word oriented switch has a first input terminal for receiving said common input signal which comprises data in the form of words, first means for selectively switching words in said common input signal on word level, and a first output terminal connected to said first switching means for outputting words;

said bit oriented switch has a second input terminal for receiving said common input signal, second means for selectively switching bits of the words in said common input signal to form new words, and a second output terminal connected to said second switching means for outputting said new words; and said selecting means is integrated in said word oriented switch and operable for selecting words switched by said first switching means in said word oriented switch or new words formed by said second switching means in said bit oriented switch, and outputting said selected words.

8. A general switch according to claim 1, wherein said selecting means is a controllable selector controlled by a control system of said general switch.

9. A general switch according to claim 1, wherein said word oriented switch comprises:

a number of input terminals for receiving input signals comprising data in the form of words, a predetermined one of said input terminals receiving said common input signal;

a number of speech stores for storing the received words, said speech stores being arrangeable as a speech store matrix having columns and rows, each input terminal being connected to the speech stores in a predetermined row of said speech store matrix such that each word received by the input terminal is stored in each one of the speech stores in said predetermined row;

a number of first multiplexors, each of which is associated with the speech stores of a respective column of said speech store matrix;

a number of control stores, each one of said control stores being associated with a respective column of said speech store matrix and with the first multiplexor that is associated with the same speech store column, and holding control information that control:

the read-out of a word from each one of the speech stores in the speech store column; and from which speech store in said speech store column that a word should be retrieved as an output word by said first multiplexor.

10. A general switch according to claim 9, wherein said bit oriented switch has a second input terminal for receiving said common input signal, second means for selectively switching bits of the words in said common input signal to form new words, and a second output terminal connected to said second switching means; and said selecting means includes a second multiplexor connected to the output terminal of a predetermined one of said first multiplexors and to the second output terminal of said bit oriented switch, said second multiplexor being controlled by additional control information stored in the first control store associated with said predetermined first multiplexor.

11. A general switch according to claim 1, wherein said bit oriented switch includes:

an input terminal for receiving said common input signal, said common input signal comprising data in the form of words, a word-to-bits disassembler connected to said input terminal for disassembling the received words to bit level such that each word is divided into a number of bits;

a number of speech stores for storing said disassembled bits, said speech stores being arrangeable as a speech store matrix having columns and rows, each row in said speech store matrix being responsive, for each disassembled word, to a predetermined one of the bits of the word such that the bit is stored in all speech stores in the row;

a number of multiplexors, each of which is associated with the speech stores of a respective column of said speech store matrix;

a number of control stores, each of which is associated with a respective column of said speech store matrix and with the corresponding multiplexor, each control store holding control information that control:

the read-out of a bit from each one of the speech stores in the speech store column; and from which speech store in said speech store column that a bit should be retrieved as an output bit by said multiplexor; and a bits-to-word converter for combining the output bits of said multiplexors into new words.

12. A general switch according to claim 1, wherein said general switch is a communication switch which further comprises:

a clock signal and synchronization signal generating system for providing clock signals and synchronization signals to said general switch; and a control system for controlling the switching operations of said general switch.

13. A general communication switch, comprising:

a number of switch modules which are arrangeable as a matrix with columns and rows; and a number of switch adapter units which are arrangeable in groups, each one of said groups of switch adapter units being associated with the switch modules of a predetermined row of said matrix for inputting words to the switch modules of said row, and with the switch modules of a predetermined column of said matrix for outputting words from the switch modules of said column;

each one of said switch modules comprising:

a word-oriented switch having a number of first input terminals for receiving words, first means for selectively switching said words on word level and a number of first output terminals for outputting words;

a bit oriented switch having a second input terminal for receiving the same words as a predetermined one of said first input terminals, second means for selectively switching bits in said same words to form new words, and a second output terminal for outputting said new words; and a first controllable selector for selecting words from a predetermined one of said first output terminals of said word oriented switch or new words formed by said bit oriented switch, said first selector having a third output terminal for outputting said selected words;

said first input terminals of the word oriented switch and said second input terminal of the bit oriented switch acting as an input interface of the switch module and the first output terminals of said word oriented switch that are not connected to said first controllable selector and said third output terminal of said first selector acting as an output interface of the switch module;

for each group of switch adapter units, a predetermined switch adapter unit being connected to receive said selected words from the first selectors in the column of switch modules associated with the group of switch adapter units and having means for forwarding bits in said selected words that are associated with currently established connections.

14. A general switch according to claim 13, wherein said word oriented switches and said bit oriented switches are time-space switches, and each switch adapter unit has a space-switching functionality unit which is operative in the process of outputting words from the associated switch modules.

15. A general switch according to claim 13, wherein said bit oriented switch includes means for setting the value of output bits, in said new words, associated with currently non-established connections, so-called inactive bits, to logical zero, and said forwarding means includes means for performing a bit-wise OR-operation on said selected words so as to forward active bits of said selected words, and said predetermined switch adapter unit further includes a second controllable selector for selecting words from the space-switching functionality unit of said predetermined switch adapter unit or words from said means for performing a bit-wise OR-operation.

16. A general switch according to claim 13, wherein said bit oriented switch includes means for setting the value of output bits, in said new words, associated with currently non-established connections, so-called inactive bits, to logical one, and said forwarding means includes means for performing a bit-wise AND-operation on said selected words so as to forward active bits of said selected words, and said predetermined switch adapter unit further includes a second controllable selector for selecting words from the space-switching functionality unit of said predetermined switch adapter unit or words from said means for performing a bit-wise-AND-operation.

17. A switching method in a general switch which comprises a word oriented switch and a bit oriented switch, said method comprising the steps of:

providing a common input signal which comprises data appearing in time slots to said word oriented switch and said bit oriented switch;

establishing, for an outgoing time slot, at least one of a first connection path through said word oriented switch and a second connection path through said bit oriented switch; and selecting, for said outgoing time slot, data from an established one of said first connection path and said second connection path.

18. A method for switching according to claim 17, wherein only one of said first connection path and said second path is established.

* * * * *